United States Patent
Chan (10) Patent No.: US 10,652,363 B2
(45) Date of Patent: May 12, 2020

(54) HANDLING DATA PROCESSING UNITS DEPLOYED ON CLOUD COMPUTING SYSTEMS FOR MOBILE APPLICATIONS

(71) Applicant: SAP SE, Walldorf (DE)

(72) Inventor: Pak Man Chan, Vancouver (CA)

(73) Assignee: SAP SE, Walldorf (DE)

(*) Notice: Subject to any disclaimer, the term of this patent is extended or adjusted under 35 U.S.C. 154(b) by 98 days.

(21) Appl. No.: 15/853,649

(22) Filed: Dec. 22, 2017

(65) Prior Publication Data

US 2019/0199829 A1    Jun. 27, 2019

(51) Int. Cl.
  *G06F 15/16* (2006.01)
  *H04L 29/08* (2006.01)
  *H04L 29/06* (2006.01)

(52) U.S. Cl.
  CPC .............. *H04L 67/36* (2013.01); *H04L 67/04* (2013.01); *H04L 67/34* (2013.01); *H04L 67/16* (2013.01); *H04L 67/42* (2013.01)

(58) Field of Classification Search
  CPC ........................................... H04L 29/06
  USPC ................. 709/203, 220, 225, 228
  See application file for complete search history.

(56) References Cited

U.S. PATENT DOCUMENTS

| | | | |
|---|---|---|---|
| 8,196,047 B2* | 6/2012 | Fisher | G06F 11/324 715/734 |
| 8,447,820 B1* | 5/2013 | Gay | G06Q 10/10 709/206 |
| 9,801,066 B1* | 10/2017 | Hanley | G06Q 20/405 |
| 9,900,423 B2* | 2/2018 | He | H04W 8/22 |
| 10,084,878 B2* | 9/2018 | Bourke | H04L 67/34 |
| 10,261,679 B2* | 4/2019 | Boodhoo | G06F 17/218 |
| 10,430,502 B2* | 10/2019 | Bourke | G06F 16/958 |
| 2014/0068421 A1* | 3/2014 | Bourke | G06F 8/38 715/235 |
| 2014/0325344 A1* | 10/2014 | Bourke | G06F 17/22 715/235 |
| 2015/0188980 A1* | 7/2015 | Bourke | H04L 67/34 709/217 |
| 2015/0244724 A1* | 8/2015 | Xu | G06F 21/6218 726/1 |
| 2017/0063809 A1* | 3/2017 | Aissi | G06F 21/60 |
| 2017/0083222 A1* | 3/2017 | Boodhoo | G06F 17/218 |
| 2017/0310784 A1* | 10/2017 | Bourke | H04L 67/34 |
| 2019/0073226 A1* | 3/2019 | Mak | G06F 3/0488 |

* cited by examiner

*Primary Examiner* — Khanh Q Dinh
(74) *Attorney, Agent, or Firm* — Fountainhead Law Group P.C.

(57) ABSTRACT

Some embodiments provide a non-transitory machine-readable medium that stores a program. The program receives a request to perform a set of data processing units on a set of data. The set of data processing units are deployed on a computing system. The program further retrieves the set of data. The program also instructs a background user interface (UI) page to perform the set of data processing units on the set of data. The program further provides results from performing the set of data processing units on the set of data.

20 Claims, 10 Drawing Sheets

FIG. 7

HANDLING DATA PROCESSING UNITS DEPLOYED ON CLOUD COMPUTING SYSTEMS FOR MOBILE APPLICATIONS

BACKGROUND

For cloud computing environments, applications, resources, data, etc. may be hosted on one or more computing devices and are accessible via networks (e.g., the Internet). Typically, a client device (e.g., a desktop computer, a laptop, a mobile device, etc.) can access the applications, resources, data, etc. hosted on the cloud computing environment through a web browser operating on the client device. In some instances, a mobile application may be developed for mobile devices so that mobile devices can access the same applications, resources, data, etc. hosted on the cloud computing system that are accessible by web browsers operating on client devices.

SUMMARY

In some embodiments, a non-transitory machine-readable medium stores a program. The program receives a request to perform a set of data processing units on a set of data. The set of data processing units are deployed on a computing system. The program further retrieves the set of data. The program also instructs a background user interface (UI) page to perform the set of data processing units on the set of data. The program further provides results from performing the set of data processing units on the set of data.

In some embodiments, the program may further send the computing system a request for the set of data processing units, receive the set of data processing units from the computing system, and load the set of data processing units in the background UI page. Retrieving the set of data may include determining whether the set of data is stored in a storage of the device, retrieving the set of data from the storage upon determining that the set of data is stored in the storage of the device, and retrieving the set of data from the computing system upon determining that the set of data is stored in the storage of the device.

In some embodiments, the set of data may include a visualization collection definition for a visualization collection. The background UI page may perform the set of data processing units on the set of data by generating a set of visualizations based on the visualization collection definition. The program may further provide a set of selectable user interface (IU) items in a graphical user interface (GUI). Each selectable UI item may represent a particular visualization collection. The request may be received through a selection of a UI item in the set of UI items that represents the visualization collection. The program may further provide a notification indicating that the set of data processing units are being performed on the set of data while the background UI page is performing the set of data processing units on the set of data. Code used to implement the set of data processing units may be not native to the device.

In some embodiments, a method receives a request to perform a set of data processing units on a set of data. The set of data processing units are deployed on a computing system. The method further retrieves the set of data. The method also instructs a background user interface (UI) page to perform the set of data processing units on the set of data. The method further provides results from performing the set of data processing units on the set of data.

In some embodiments, the method may further send the computing system a request for the set of data processing units, receive the set of data processing units from the computing system, and load the set of data processing units in the background UI page. Retrieving the set of data may include determining whether the set of data is stored in a storage of the device, retrieving the set of data from the storage upon determining that the set of data is stored in the storage of the device, and retrieving the set of data from the computing system upon determining that the set of data is stored in the storage of the device.

In some embodiments, the set of data may include a visualization collection definition for a visualization collection. The background UI page may perform the set of data processing units on the set of data by generating a set of visualizations based on the visualization collection definition. The method may further provide a set of selectable user interface (IU) items in a graphical user interface (GUI). Each selectable UI item may represents a particular visualization collection. The request may be received through a selection of a UI item in the set of UI items that represents the visualization collection. The method may further provide a notification indicating that the set of data processing units are being performed on the set of data while the background UI page is performing the set of data processing units on the set of data.

In some embodiments, a system includes a set of processing units and a non-transitory machine-readable medium that stores instructions. The instructions cause at least one processing unit to receive a request to perform a set of data processing units on a set of data, wherein the set of data processing units are deployed on a computing system. The instructions further cause the at least one processing unit to retrieve the set of data. The instructions also cause the at least one processing unit to instruct a background user interface (UI) page to perform the set of data processing units on the set of data. The instructions further cause the at least one processing unit to provide results from performing the set of data processing units on the set of data.

In some embodiments, the instructions may further cause the at least one processing unit to send the computing system a request for the set of data processing units, receive the set of data processing units from the computing system, and load the set of data processing units in the background UI page. Retrieving the set of data may include determining whether the set of data is stored in a storage of the device, retrieving the set of data from the storage upon determining that the set of data is stored in the storage of the device, and retrieving the set of data from the computing system upon determining that the set of data is stored in the storage of the device.

In some embodiments, the set of data may include a visualization collection definition for a visualization collection. The background UI page may perform the set of data processing units on the set of data by generating a set of visualizations based on the visualization collection definition. The instructions may further cause the at least one processing unit to provide a set of selectable user interface (IU) items in a graphical user interface (GUI). Each selectable UI item may represent a particular visualization collection. The request may be received through a selection of a UI item in the set of UI items that represents the visualization collection. The instructions may further cause the at least one processing unit to provide a notification indicating that the set of data processing units are being performed on the set of data while the background UI page is performing the set of data processing units on the set of data. Code used to implement the set of data processing units may be not native to the system.

The following detailed description and accompanying drawings provide a better understanding of the nature and advantages of the present invention.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for handling data processing units deployed on computing systems for mobile applications. In some embodiments, a mobile device includes a mobile application that is configured to perform data processing units deployed on a computing system (e.g., a cloud computing system). In some embodiments, a data processing unit includes one or more functions, services, etc., configured to retrieve, manipulate, transform, derive, etc. data. In some such embodiments, a data processing unit is implemented by Javascript (JS) code in a Javascript file (e.g., a JS file). When a user of the mobile device requests data to be processed by a data processing unit, the mobile device may request the cloud computing system for the data processing unit. Then, the mobile device may retrieve the data and utilize a background user interface (UI) page to perform the data processing unit on the data. The mobile device provides results from performing the data processing unit on the data to the user of the mobile device.

Figure 1:
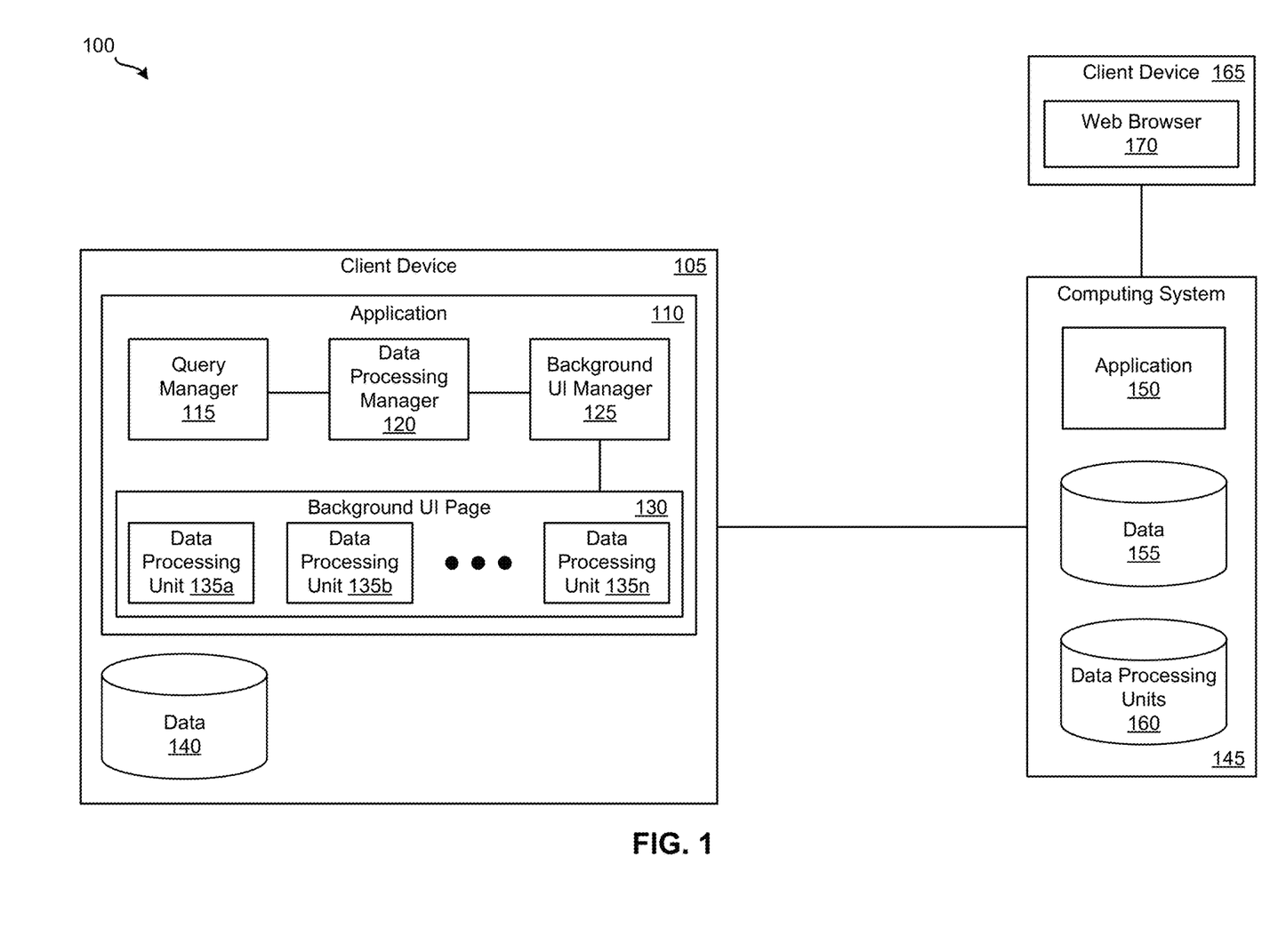
FIG. 1 illustrates a system according to some embodiments.

FIG. 1 illustrates a system 100 according to some embodiments. As shown, system 100 includes client device 105, computing system 145, and client device 165. In some embodiments, client device 105 is a mobile device (e.g., a smartphone, a tablet, a media (e.g., music, videos, etc.) player, etc.) configured to run applications developed using a particular mobile platform (e.g., an Android operating system, an iOS operating system, etc.). FIG. 1 illustrates that client device 105 includes application 110 and data storage 140. In some embodiments, application 110 is a native application built using native code for client device 105. For example, client device 105 may be a mobile device that is configured to run applications developed using a particular mobile platform. In such an example, application 110 may be developed using code supported by the particular mobile platform and compiled to run on client device 105. In this example, application 110 may not operate on another device that is configured to run applications developing using a different platform (e.g., a platform other than the particular mobile platform).

Data storage 140 is configured to store data associated with application 110. In some embodiments, data storage 140 is implemented in a single physical storage while, in other embodiments, data storage 140 may be implemented across several physical storages. While FIG. 1 shows data storage 140 as part of client device 105, one of ordinary skill in the art will appreciate that data storage 140 may be external to client device 105 in some embodiments.

Application 110 may be a software application operating on client device 105. Application 110 may be any number of different types of applications. For instance, application 110 may be an analytics application, a data management application, a human capital management application, an enterprise management application, a customer relationship management application, a financial management application, etc.

As shown in FIG. 1, application 110 includes query manager 115, data processing manager 120, background user interface (UI) manager 125, and background UI page 130. Query manager 115 is responsible for retrieving data used for processing by data processing units. For example, query manager 115 may receive from a user of client device 105 a request to perform a set of data processing units on a set of data. In response to such a request, query manager 115 accesses data storage 140 to determine whether the requested set of data is stored in data storage 140. If so, query manager 115 sends data processing manager 120 the set of data and a request to perform the set of data processing units on the set of data. If not, query manager 115 accesses data storage 155 and retrieves the requested set of data. When query manager 115 receives the set of data from computing system 145, query manager 115 sends data processing manager 120 the set of data and a request to perform the set of data processing units on the set of data. Once the set of data processing units are performed on the set of data, query manager 115 may receive from data processing manage 120 results from the performance of the set of data processing units on the set of data. Application 110 then provides (e.g., by displaying on a display of client device 105) the results to the user of client device 105.

Data processing manager 120 is configured to manage the processing of data for application 110. For instance, data processing manage 120 may receive from query manager 115 a set of data and a request to perform a set of data processing units on the set of data. In response to the request, data processing manager 120 may perform a set of pre-processing operations. In some embodiments, the set of pre-processing operations include checking the version of the set of data and checking the version of the set of data processing units. If the versions are compatible (e.g., the version of the set of data is the same as the version of the set of data processing units), data processing manager 120 sends background UI manager 125 the set of data and a request to perform the set of data processing units on the set of data. If the versions are not compatible, data processing manager 120 sends query manager 115 a notification that it cannot perform the set of processing units on the set of data. After the set of data processing units are performed on the set of data, data processing manager 120 may receive from background UI manager 125 results from the performance of the set of data processing units on the set of data. Next, data processing manager 120 forwards the results to query manager 115.

Background UI manager 125 is configured to manage background UI pages. In some embodiments, when application 110 is started and loads background UI manager 125, background UI manager 125 generates background UI page 130 and retrieves data processing units 135a-n from data processing units storage 145. In some embodiments, background UI manager 125 retrieves data processing units 135a-n by using a uniform resource locator (URL) to navigate to data processing units storage 160. After retrieving data processing units 135a-n, background UI manager 125 loads data processing units 135a-n in background UI page 130. While FIG. 1 shows one background UI page, one of ordinary skill in the art will appreciate that background UI manager 125 may generate several background UI pages and load data processing units 135a-n in each of the generated background UI pages.

In some instances, background UI manager 125 can receive from data processing manager 120 a set of data and a request to perform a set of data processing units on the set of data. In response, background UI manager 125 sends the set of data to background UI page 130 along with a request to perform the set of data processing units on the set of data. Once the set of data processing units are performed on the set of data, background UI manager 125 may receive from background UI page 130 results from the performance of the set of data processing units on the set of data. Background UI manager 125 then forwards the results to data processing manager 120.

Background UI page 130 is configured to perform data processing units 135a-n on data. In some embodiments, a background UI page is an out-of-process browser configured to load and/or render web pages while out of view of a user of client device 105 (e.g., not displayed on a display of client device 105). Background UI page 130 can receive from background UI manager 125 a set of data and a request to perform a set of data processing units on the set of data. In response to such a request, background UI page 130 determines one or more data processing units 135a-n that correspond to the set of data processing units specified in the request. For each data processing unit 135 in the one or more determined data processing units 135a-n, background UI page 130 sends appropriate data from the set of data to the data processing unit 135 and instructs it to process the data. Once the one or more determined data processing units 135a-n completes the processing of the data, background UI page 130 receives results from the processing of the data from the one or more determined data processing units 135a-n. Then, background UI page 130 forwards the results to background UI manager 125.

As shown in FIG. 1, computing system 145 includes application 150, data storage 155, and data processing units storage 160. Data storage 155 stores data associated with application 150. Data processing units storage 160 may store data processing units. As explained above, in some embodiments, a data processing unit includes one or more functions, services, etc., configured to retrieve, manipulate, transform, derive, etc. data. In some such embodiments, the code used to implement a data processing unit is code that is not native (e.g., non-native code) to client device 105. For example, such code may be Javascript (JS) code. In some embodiments, storages 155 and 160 are implemented in a single physical storage while, in other embodiments, storages 155 and 160 may be implemented across several physical storages. While FIG. 1 shows storages 155 and 160 as part of computing system 145, one of ordinary skill in the art will recognize that storages 155 and/or 160 may be external to computing system 145 in some embodiments.

Application 150 can be a software application operating on (e.g., hosted on) computing system 145 that may be accessed by client device 165. Application 150 may be any number of different types of applications. For instance, application 150 may be an analytics application, a data management application, a human capital management application, an enterprise management application, a customer relationship management application, a financial management application, etc. Application 150 allows client device 165 to communicate and interact with application 150 by accessing and executing data processing units stored in data processing units storage 160. By deploying data processing units 160 on computing system 145, application 110 can provide the same or similar functionality to client device 105 as that provided by application 150 to client device 165 because the same data processing units are used by application 150 and application 110.

As illustrated in FIG. 1, client device 165 includes web browser 170. Web browser 170 may be a software application configured to communicate and interact with computing system 145 using any number of different protocols (e.g., an HTTP protocol, an HTTP secure (HTTPS) protocol, etc.). For instance, web browser application 170 can access features and functionalities provided by application 150 by accessing and executing data processing units stored in data processing units storage 160.

Figure 2:
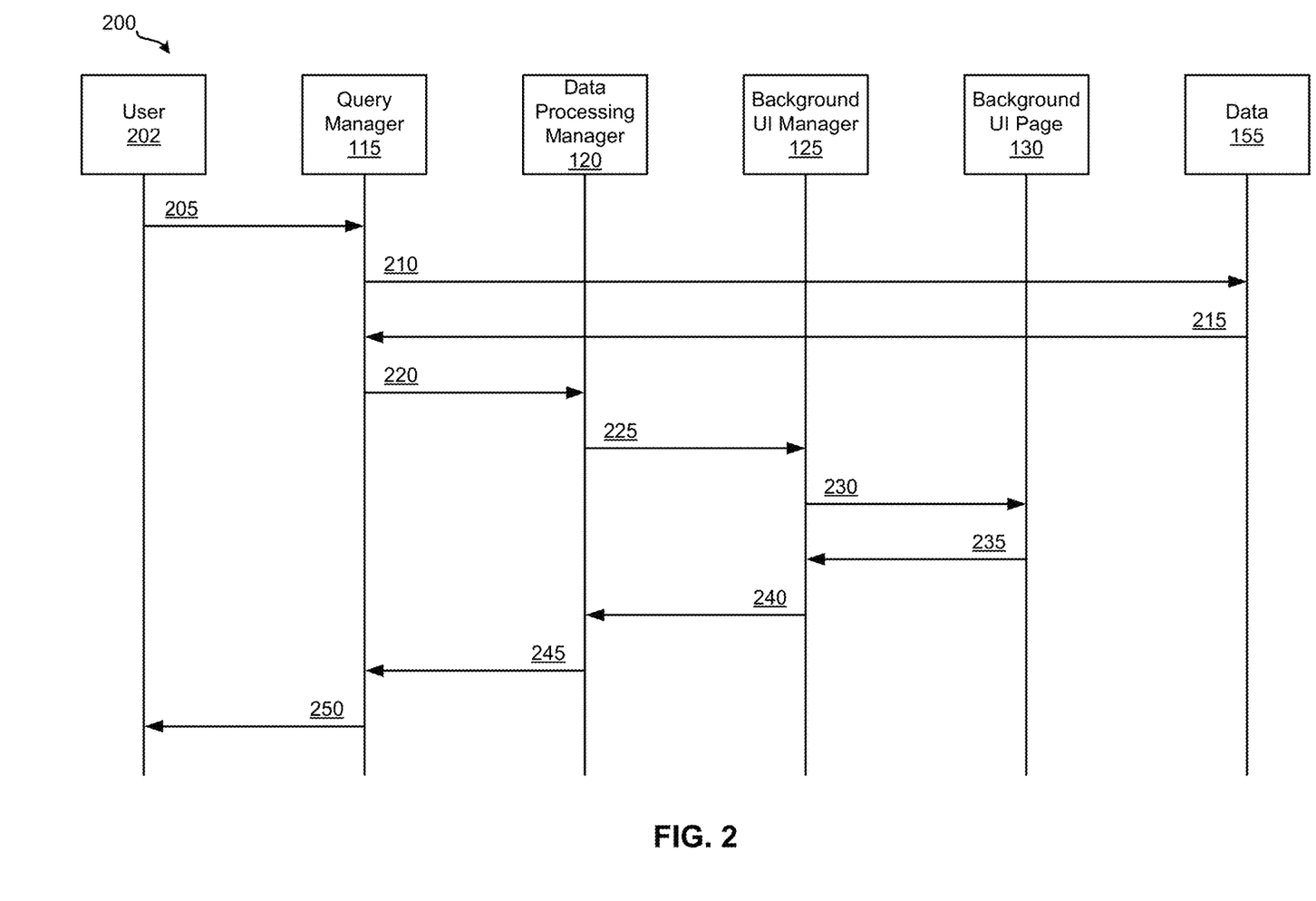
FIG. 2 illustrates an example dataflow through the system illustrated in FIG. 1 according to some embodiments.
Figure 3A:
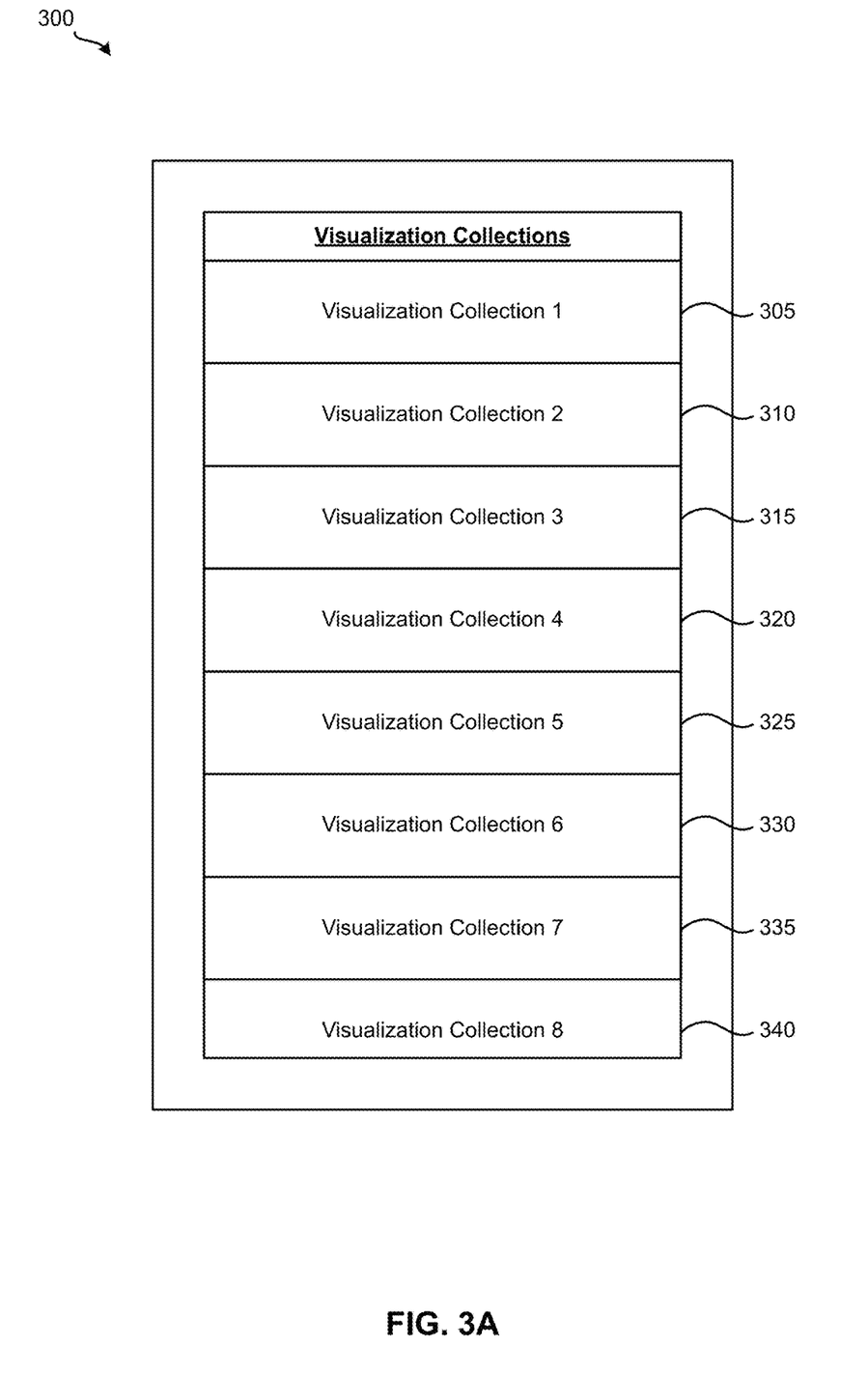
FIGS. 3A-3D illustrate an example graphical user interface (GUI) for providing visualization collections according to some embodiments.

An example operation of system 100 will now be described by reference to FIGS. 2 and 3A-3D. FIG. 2 illustrates an example dataflow 200 through system 100 according to some embodiments. FIGS. 3A-3D illustrate an example graphical user interface (GUI) 300 for providing visualization collections according to some embodiments. The example operation starts by application 110 providing a page of selectable UI items that represent visualization collections to a user of client device 105. In some embodiments, a visualization collection includes one or more visualizations of data (e.g., chart visualization such as bar charts, pie charts, line charts, scatter charts, etc.). FIG. 3A illustrates an example of a page of visualization collections according to some embodiments. As shown in FIG. 3A, GUI 300 includes selectable UI items 305-340 that represent visualization collections 1-8, respectively. A selection of one of the UI items 305-340 causes application 110 to provide a visualization collection that corresponds to the selected UI item.

Figure 3B:
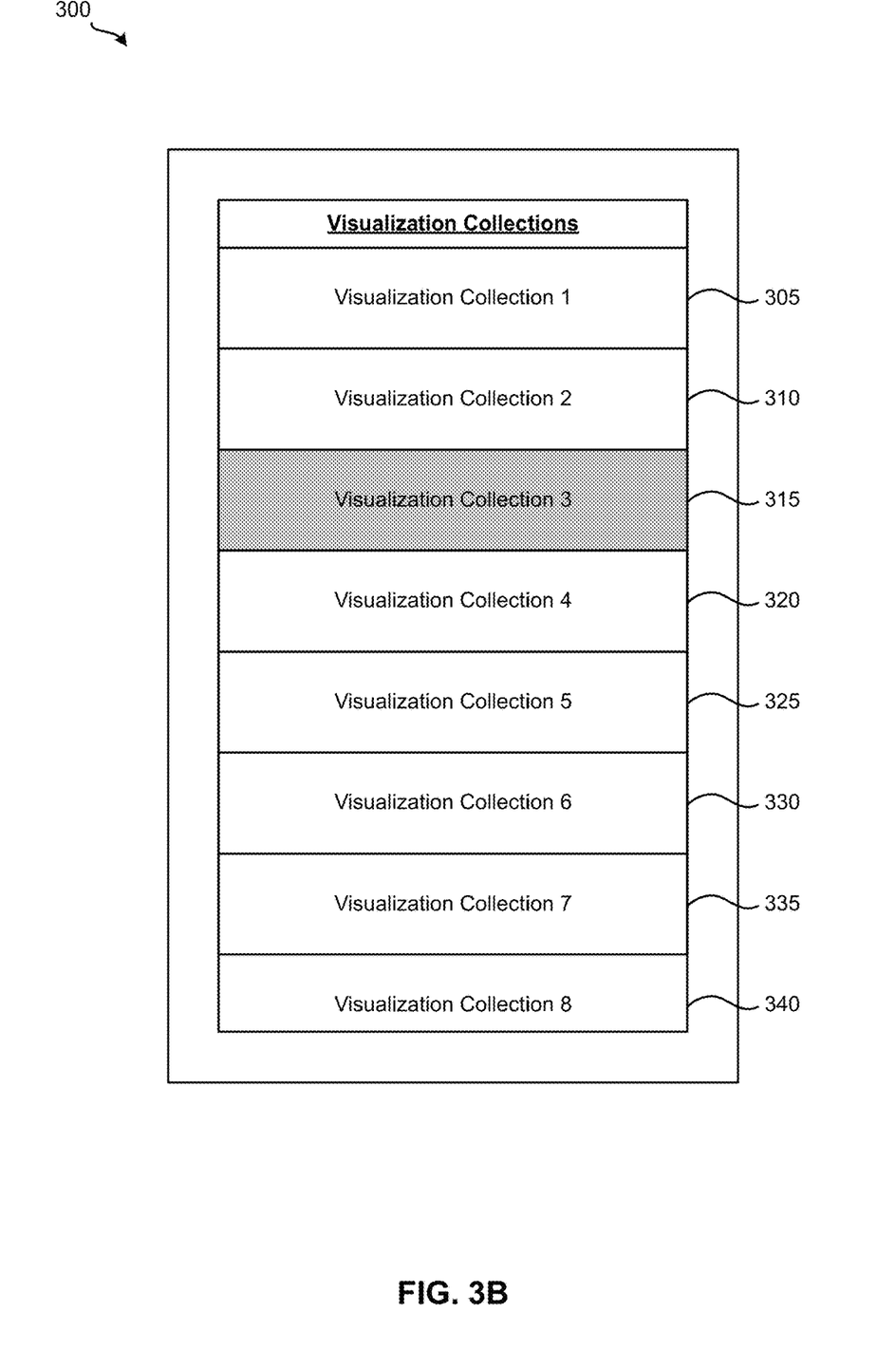

In this example, the user of client device 105 selects a UI item representing a particular visualization collection. Specifically, the user of client device selects UI item 315, which represents visualization collection 3. FIG. 3B illustrates GUI 300 after the user of client device 105 makes such a selection according to some embodiments. As shown in FIG. 3B, UI item 315 is highlighted to indicate the selection of UI item 315. Referring to FIG. 2, when the user of client device 105 (user 202 in this example) selects UI item 315, user 202 is sending, at 205, query manager 115 a request to perform a set of data processing units on a visualization collection definition for visualization collection 3. In some embodiments, a visualization collection definition for a visualization collection specifies one or more visualizations that belong to the visualization collection. For each visualization in a visualization collection, the visualization collection definition includes a visualization definition of the visualization. In some embodiments, a visualization definition of a visualization specifies a type of the visualization (e.g., a bar chart visualization, a pie chart visualization, a line chart visualization, a scatter chart visualization, etc.), a title of the visualization, a set of queries for data for the visualization, and a data source of the data for the visualization. In some instances, a visualization definition may specify additional and/or different information such as a set of filters for the visualization, modeling information associated with the visualization, etc. For this example, the set of data processing units includes a data processing unit configured to process a visualization collection definition and generate visualizations specified in the visualization collection definition.

Next, query manager 115 accesses data storage 140 to determine whether the visualization collection definition for visualization collection 3 is stored in data storage 140. In this example, the visualization collection definition for visualization collection 3 is not stored in data storage 140. Thus, query manager 115 accesses, at 210, data storage 155 and retrieves, at 215, the visualization collection definition for visualization collection 3. Then, query manager 115 sends, at 220, data processing manager 120 the visualization collection definition and a request to perform the set of data processing units on the visualization collection definition.

When data processing manage 120 receives from the visualization collection definition for visualization collection 3 and the request to perform the set of data processing units on the visualization collection definition, data processing manager 120 performs a set of pre-processing operations that includes checking the version of the visualization collection definition and the version of the set of data processing units and determining whether the versions are compatible. In this example, data processing manager 120 determines that the versions are compatible. Therefore, data processing manager 120 sends, at 225, background UI manager 125 the visualization collection definition and a request to perform the set of data processing units on the set of data.

Upon receiving the set of data and the request to perform the set of data processing units on the visualization collection definition for visualization collection 3, background UI manager 125 sends, at 230, the visualization collection definition to background UI page 130 and instructs background UI page 130 to perform the set of data processing units on the visualization collection definition. Next, background UI page 130 determines the data processing unit 135 that is configured to process a visualization collection definition, sends the visualization collection definition for visualization collection 3 to the data processing unit 135, and instructs the data processing unit 135 to process the visualization collection definition.

In this example, the data processing unit 135 processes the visualization collection definition by generating a visualization for each visualization definition included in the visualization collection definition. Then, the data processing unit 135 sends the generated visualizations to background UI page 130, which sends, at 235, the generated visualizations to background UI manager 125. Background UI manager 125 forwards, at 240, the generated visualizations to data processing manager 120, which forwards, at 245, them to query manager 115. When query manager 115 receives the generated visualizations, query manager 115 provides (e.g., by displaying on a display of client device 105) them to user 202.

Figure 3C:
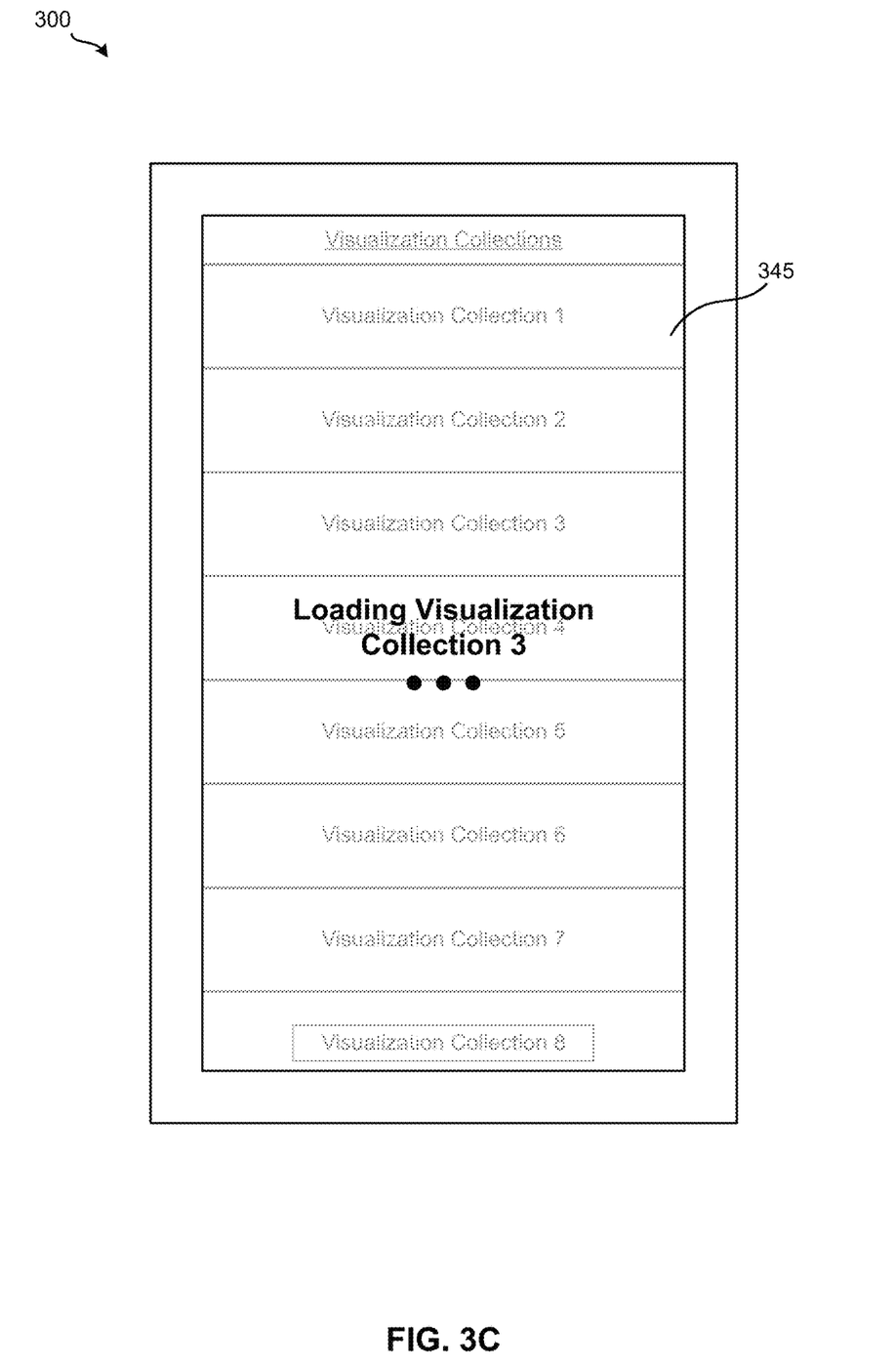
Figure 3D:
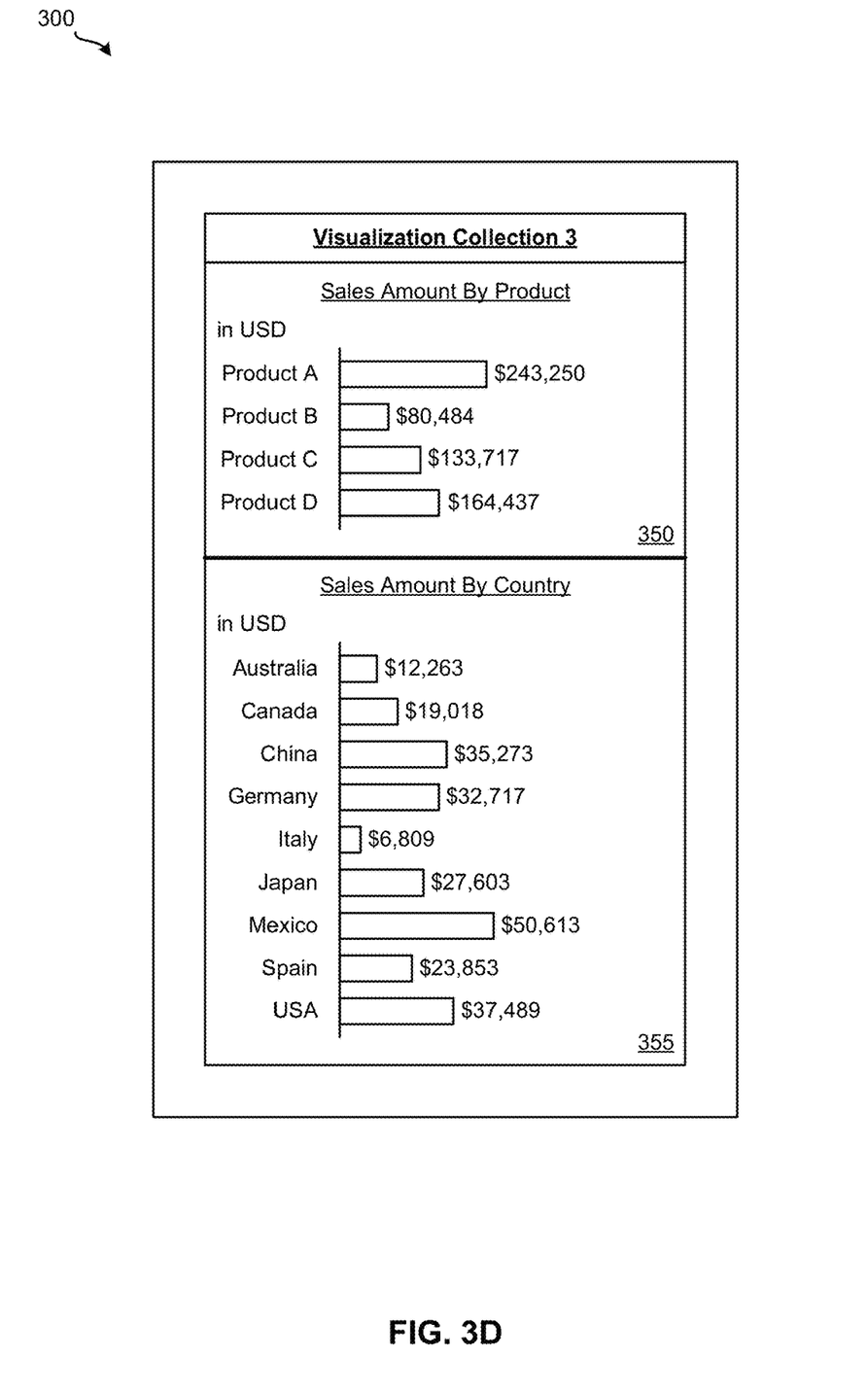

While application 110 is processing the request from user 202 (e.g., operations 210-245), application 110 may provide user 202 with a notification indicating that the visualization collection is being processed. FIG. 3C illustrates an example of such an indication according to some embodiments. As shown in FIG. 3C, the elements of GUI 300 illustrated in FIG. 3A (e.g., the title and UI items 305-340) are lightened and overlaid with a notification 345. Notification 345 indicates that visualization collection 3 is being loaded. In this example, when query manager 115 provides user 202 with the visualizations generated from the visualization collection definition for visualization collection 3, query manager 115 presents the visualizations on a display of client device 105. FIG. 3D illustrates an example of visualizations in a visualization collection according to some embodiments. As shown in GUI 300 of FIG. 3D, visualization collection 3 includes visualizations 350 and 355. In particular, visualization 350 is a bar chart of sales amount by product (Product A, Product B, Product C, and Product D in this example). Visualization is a bar chart of sales amount by country (Australia, Canada, China, Germany, Italy, Japan, Mexico, Spain, and USA for this example).

Figure 4:
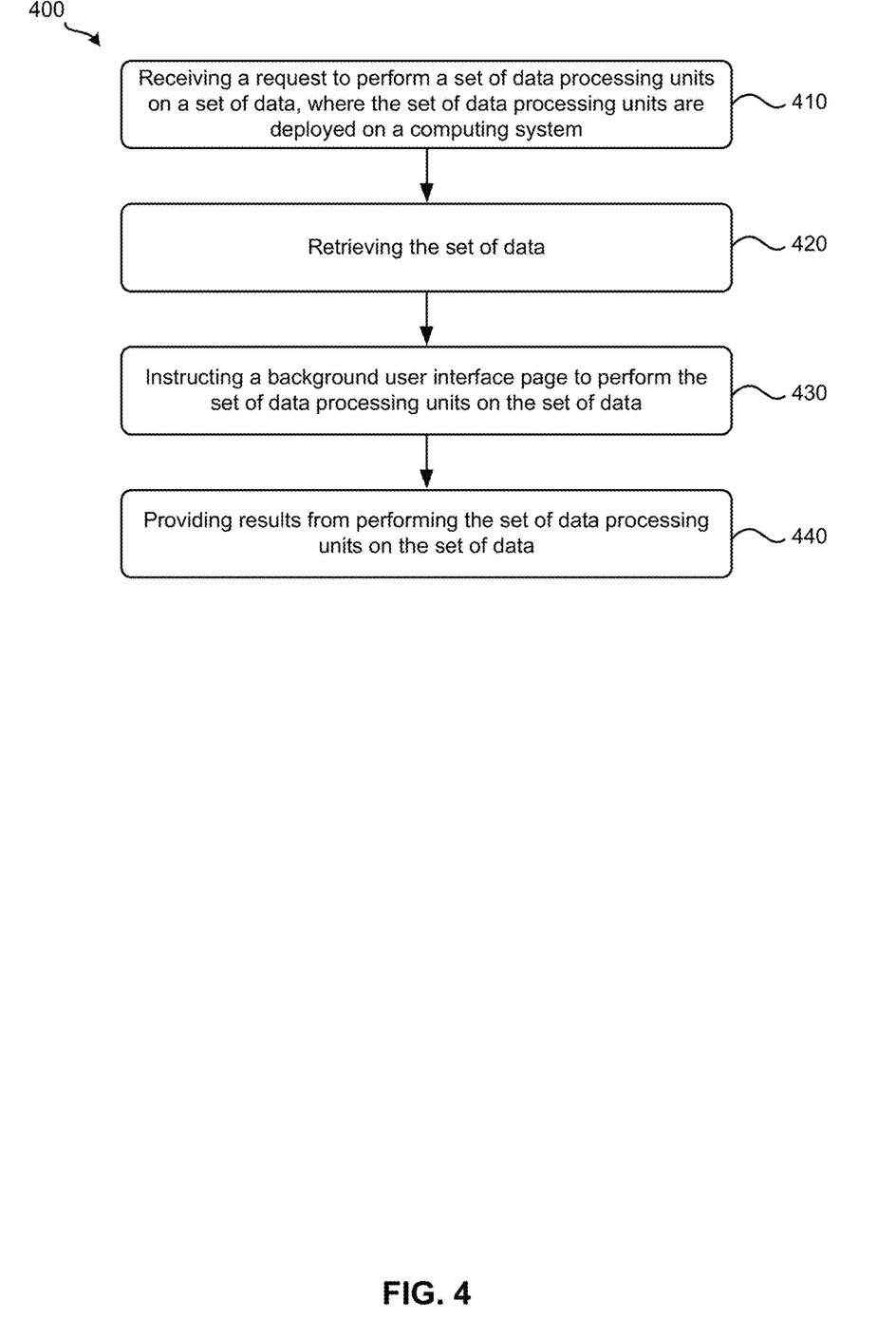
FIG. 4 illustrates a process for performing data processing units according to some embodiments.

FIG. 4 illustrates a process 400 for performing data processing units according to some embodiments. In some embodiments, application 110 performs process 400. Process begins by receiving, at 410, a request to perform a set of data processing units on a set of data where the set of data processing units are deployed on a computing system. Referring to FIGS. 1 and 2 as an example, user 202 (the user of client device 105) may select UI item 315, which represents visualization collection 3. The selection may amount to user 202 sending, at 205, query manager 115 a request to perform a set of data processing units on a visualization collection definition for visualization collection 3.

Next, process 400 retrieves, at 420, the set of data. Referring to FIGS. 1 and 2 and continuing with the above example, query manager 115 can access data storage 140 to determine whether the visualization collection definition for visualization collection 3 is stored in data storage 140. For this example, the visualization collection definition for visualization collection 3 is not stored in data storage 140. Hence, query manager 115 accesses, at 210, data storage 155 and retrieves, at 215, the visualization collection definition for visualization collection 3.

Process 400 then instructs, at 430, a background UI page to perform the set of data processing units on the set of data. Referring to FIGS. 1 and 2 and continuing with the above example, query manager 115 may send, at 220, data processing manager 120 the visualization collection definition and a request to perform the set of data processing units on the visualization collection definition. Data processing manager 120 may perform a set of pre-processing operations that includes checking the version of the visualization collection definition and the version of the set of data processing units and determining whether the versions are compatible. For this example, data processing manager 120 determines that the versions are compatible. Thus, data processing manager 120 sends, at 225, background UI manager 125 the visualization collection definition and a request to perform the set of data processing units on the set of data. Background UI manager 125 may send, at 230, the visualization collection definition to background UI page 130 and then instruct background UI page 130 to perform the set of data processing units on the visualization collection definition Finally, process 400 provides, at 440, results from performing the set of data processing units on the set of data. Referring to FIGS. 1 and 2 and continuing with the above example, background UI page 130 determines the data processing unit 135 that is configured to process a visualization collection definition and instructs the data processing unit 135 to process the visualization collection definition. The data processing unit 135 processes the visualization collection definition by generating a visualization for each visualization definition included in the visualization collection definition. The data processing unit 135 then sends the generated visualizations to background UI page 130, which sends, at 235, the generated visualizations to background UI manager 125. Next, background UI manager 125 forwards, at 240, the generated visualizations to data processing manager 120, which forwards, at 245, them to query manager 115, which provides (e.g., by displaying on a display of client device 105) them to user 202.

Figure 5:
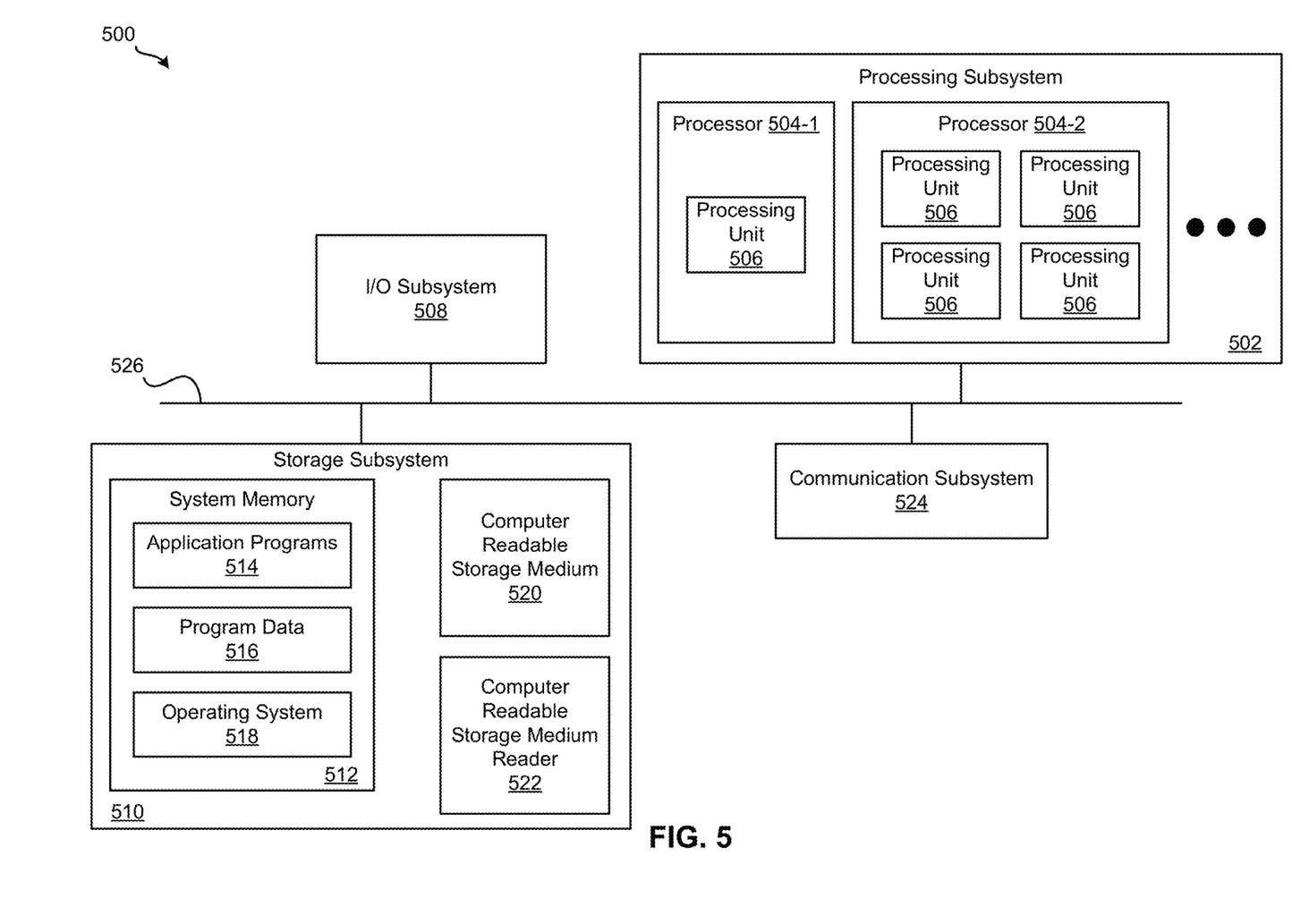
FIG. 5 illustrates an exemplary computer system, in which various embodiments may be implemented.

FIG. 5 illustrates an exemplary computer system 500 for implementing various embodiments described above. For example, computer system 500 may be used to implement systems client device 105, computing system 145, and client device 165. Computer system 500 may be a desktop computer, a laptop, a server computer, or any other type of computer system or combination thereof. Some or all elements of query manager 115, data processing manager 120, background UI manager 125, background UI page 130, application 150, web browser 170, or combinations thereof can be included or implemented in computer system 500. In addition, computer system 500 can implement many of the operations, methods, and/or processes described above (e.g., process 400). As shown in FIG. 5, computer system 500 includes processing subsystem 502, which communicates, via bus subsystem 526, with input/output (I/O) subsystem 508, storage subsystem 510 and communication subsystem 524.

Bus subsystem 526 is configured to facilitate communication among the various components and subsystems of computer system 500. While bus subsystem 526 is illustrated in FIG. 5 as a single bus, one of ordinary skill in the art will understand that bus subsystem 526 may be implemented as multiple buses. Bus subsystem 526 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 502, which can be implemented as one or more integrated circuits (e.g., a conventional microprocessor or microcontroller), controls the operation of computer system 500. Processing subsystem 502 may include one or more processors 504. Each processor 504 may include one processing unit 506 (e.g., a single core processor such as processor 504-1) or several processing units 506 (e.g., a multicore processor such as processor 504-2). In some embodiments, processors 504 of processing subsystem 502 may be implemented as independent processors while, in other embodiments, processors 504 of processing subsystem 502 may be implemented as multiple processors integrate into a single chip or multiple chips. Still, in some embodiments, processors 504 of processing subsystem 502 may be implemented as a combination of independent processors and multiple processors integrated into a single chip or multiple chips.

In some embodiments, processing subsystem 502 can execute a variety of programs or processes in response to program code and can maintain multiple concurrently executing programs or processes. At any given time, some or all of the program code to be executed can reside in processing subsystem 502 and/or in storage subsystem 510. Through suitable programming, processing subsystem 502 can provide various functionalities, such as the functionalities described above by reference to process 400, etc.

I/O subsystem 508 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 500 to a user or another device (e.g., a printer).

As illustrated in FIG. 5, storage subsystem 510 includes system memory 512, computer-readable storage medium 520, and computer-readable storage medium reader 522. System memory 512 may be configured to store software in the form of program instructions that are loadable and executable by processing subsystem 502 as well as data generated during the execution of program instructions. In some embodiments, system memory 512 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 512 may include different types of memory, such as static random access memory (SRAM) and/or dynamic random access memory (DRAM). System memory 512 may include a basic input/output system (BIOS), in some embodiments, that is configured to store basic routines to facilitate transferring information between elements within computer system 500 (e.g., during start-up). Such a BIOS may be stored in ROM (e.g., a ROM chip), flash memory, or any other type of memory that may be configured to store the BIOS.

As shown in FIG. 5, system memory 512 includes application programs 514 (e.g., application 110, application 150, etc.), program data 516, and operating system (OS) 518. OS 518 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 520 may be a non-transitory computer-readable medium configured to store software (e.g., programs, code modules, data constructs, instructions, etc.). Many of the components (e.g., query manager 115, data processing manager 120, background UI manager 125, background UI page 130, application 150, and web browser 170) and/or processes (e.g., process 400) described above may be implemented as software that when executed by a processor or processing unit (e.g., a processor or processing unit of processing subsystem 502) performs the operations of such components and/or processes. Storage subsystem 510 may also store data used for, or generated during, the execution of the software.

Storage subsystem 510 may also include computer-readable storage medium reader 522 that is configured to communicate with computer-readable storage medium 520. Together and, optionally, in combination with system memory 512, computer-readable storage medium 520 may comprehensively represent remote, local, fixed, and/or removable storage devices plus storage media for temporarily and/or more permanently containing, storing, transmitting, and retrieving computer-readable information.

Computer-readable storage medium 520 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 524 serves as an interface for receiving data from, and transmitting data to, other devices, computer systems, and networks. For example, communication subsystem 524 may allow computer system 500 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 524 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 524 may provide components configured for wired communication (e.g., Ethernet) in addition to or instead of components configured for wireless communication.

One of ordinary skill in the art will realize that the architecture shown in FIG. 5 is only an example architecture of computer system 500, and that computer system 500 may have additional or fewer components than shown, or a different configuration of components. The various components shown in FIG. 5 may be implemented in hardware, software, firmware or any combination thereof, including one or more signal processing and/or application specific integrated circuits.

Figure 6:
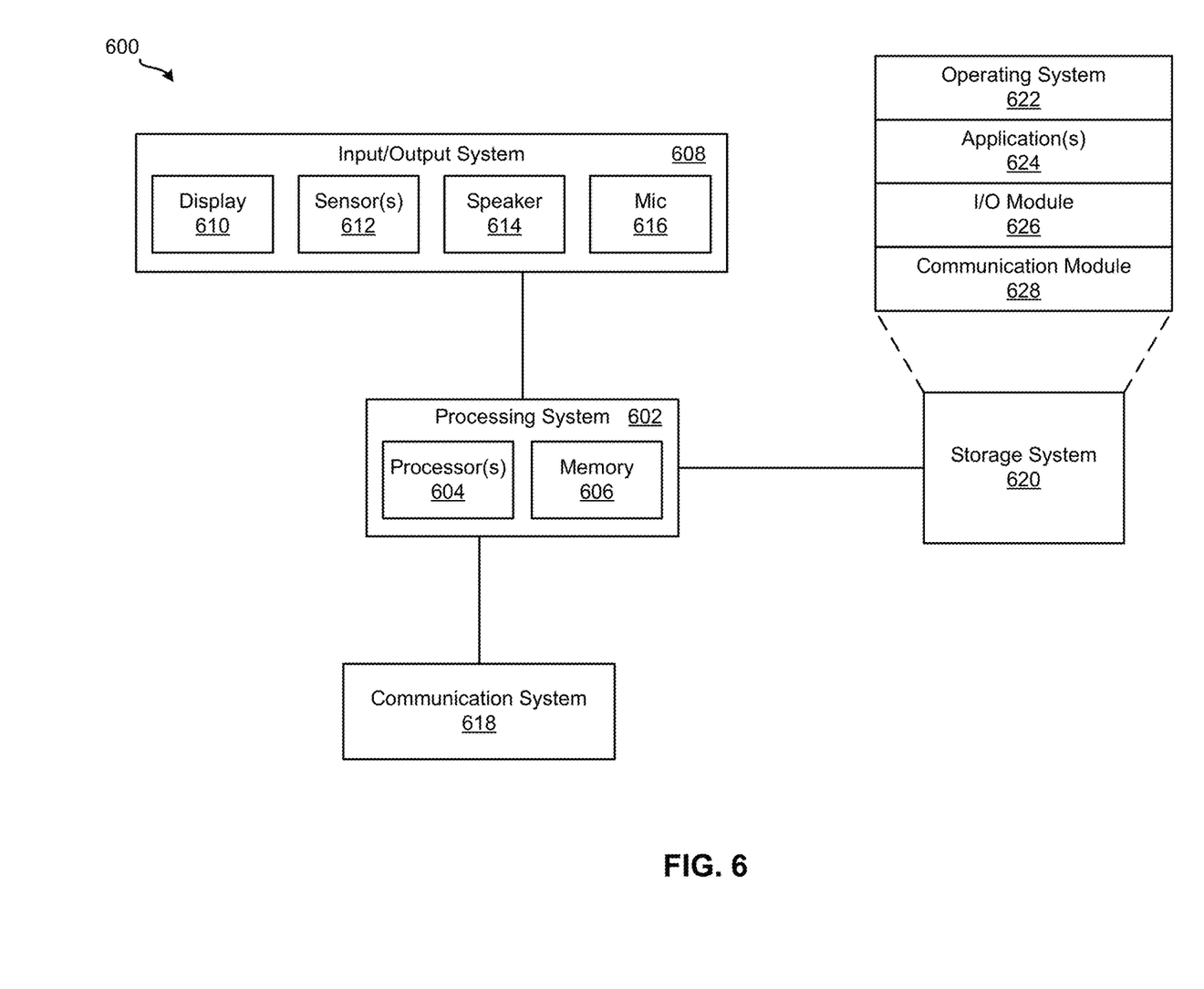
FIG. 6 illustrates an exemplary computing device, in which various embodiments may be implemented.

FIG. 6 illustrates an exemplary computing device 600 for implementing various embodiments described above. For example, computing device 600 may be used to implement client device 105 and client device 165. Computing device 600 may be a cellphone, a smartphone, a wearable device, an activity tracker or manager, a tablet, a personal digital assistant (PDA), a media player, or any other type of mobile computing device or combination thereof. Some or all elements of query manager 115, data processing manager 120, background UI manager 125, background UI page 130, web browser 170, or combinations thereof can be included or implemented in computing device 600. In addition, computing device 600 can implement many of the operations, methods, and/or processes described above (e.g., process 400). As shown in FIG. 6, computing device 600 includes processing system 602, input/output (I/O) system 608, communication system 618, and storage system 620. These components may be coupled by one or more communication buses or signal lines.

Processing system 602, which can be implemented as one or more integrated circuits (e.g., a conventional microprocessor or microcontroller), controls the operation of computing device 600. As shown, processing system 602 includes one or more processors 604 and memory 606. Processors 604 are configured to run or execute various software and/or sets of instructions stored in memory 606 to perform various functions for computing device 600 and to process data.

Each processor of processors 604 may include one processing unit (e.g., a single core processor) or several processing units (e.g., a multicore processor). In some embodiments, processors 604 of processing system 602 may be implemented as independent processors while, in other embodiments, processors 604 of processing system 602 may be implemented as multiple processors integrate into a single chip. Still, in some embodiments, processors 604 of processing system 602 may be implemented as a combination of independent processors and multiple processors integrated into a single chip.

Memory 606 may be configured to receive and store software (e.g., operating system 622, applications 624, I/O module 626, communication module 628, etc. from storage system 620) in the form of program instructions that are loadable and executable by processors 604 as well as data generated during the execution of program instructions. In some embodiments, memory 606 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 608 is responsible for receiving input through various components and providing output through various components. As shown for this example, I/O system 608 includes display 610, one or more sensors 612, speaker 614, and microphone 616. Display 610 is configured to output visual information (e.g., a graphical user interface (GUI) generated and/or rendered by processors 604). In some embodiments, display 610 is a touch screen that is configured to also receive touch-based input. Display 610 may be implemented using liquid crystal display (LCD) technology, light-emitting diode (LED) technology, organic LED (OLED) technology, organic electro luminescence (OEL) technology, or any other type of display technologies. Sensors 612 may include any number of different types of sensors for measuring a physical quantity (e.g., temperature, force, pressure, acceleration, orientation, light, radiation, etc.). Speaker 614 is configured to output audio information and microphone 616 is configured to receive audio input. One of ordinary skill in the art will appreciate that I/O system 608 may include any number of additional, fewer, and/or different components. For instance, I/O system 608 may include a keypad or keyboard for receiving input, a port for transmitting data, receiving data and/or power, and/or communicating with another device or component, an image capture component for capturing photos and/or videos, etc.

Communication system 618 serves as an interface for receiving data from, and transmitting data to, other devices, computer systems, and networks. For example, communication system 618 may allow computing device 600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 618 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 618 may provide components configured for wired communication (e.g., Ethernet) in addition to or instead of components configured for wireless communication.

Storage system 620 handles the storage and management of data for computing device 600. Storage system 620 may be implemented by one or more non-transitory machine-readable mediums that are configured to store software (e.g., programs, code modules, data constructs, instructions, etc.) and store data used for, or generated during, the execution of the software. Many of the components (e.g., query manager 115, data processing manager 120, background UI manager 125, background UI page 130, and web browser 170) and/or processes (e.g., process 400) described above may be implemented as software that when executed by a processor or processing unit (e.g., processors 604 of processing system 602) performs the operations of such components and/or processes.

In this example, storage system 620 includes operating system 622, one or more applications 624, I/O module 626, and communication module 628. Operating system 622 includes various procedures, sets of instructions, software components and/or drivers for controlling and managing general system tasks (e.g., memory management, storage device control, power management, etc.) and facilitates communication between various hardware and software components. Operating system 622 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 624 can include any number of different applications installed on computing device 600. For example, application 110 and/or web browser 170 may be installed on computing device 600. Other examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 626 manages information received via input components (e.g., display 610, sensors 612, and microphone 616) and information to be outputted via output components (e.g., display 610 and speaker 614). Communication module 628 facilitates communication with other devices via communication system 618 and includes various software components for handling data received from communication system 618.

One of ordinary skill in the art will realize that the architecture shown in FIG. 6 is only an example architecture of computing device 600, and that computing device 600 may have additional or fewer components than shown, or a different configuration of components. The various components shown in FIG. 6 may be implemented in hardware, software, firmware or any combination thereof, including one or more signal processing and/or application specific integrated circuits.

Figure 7:
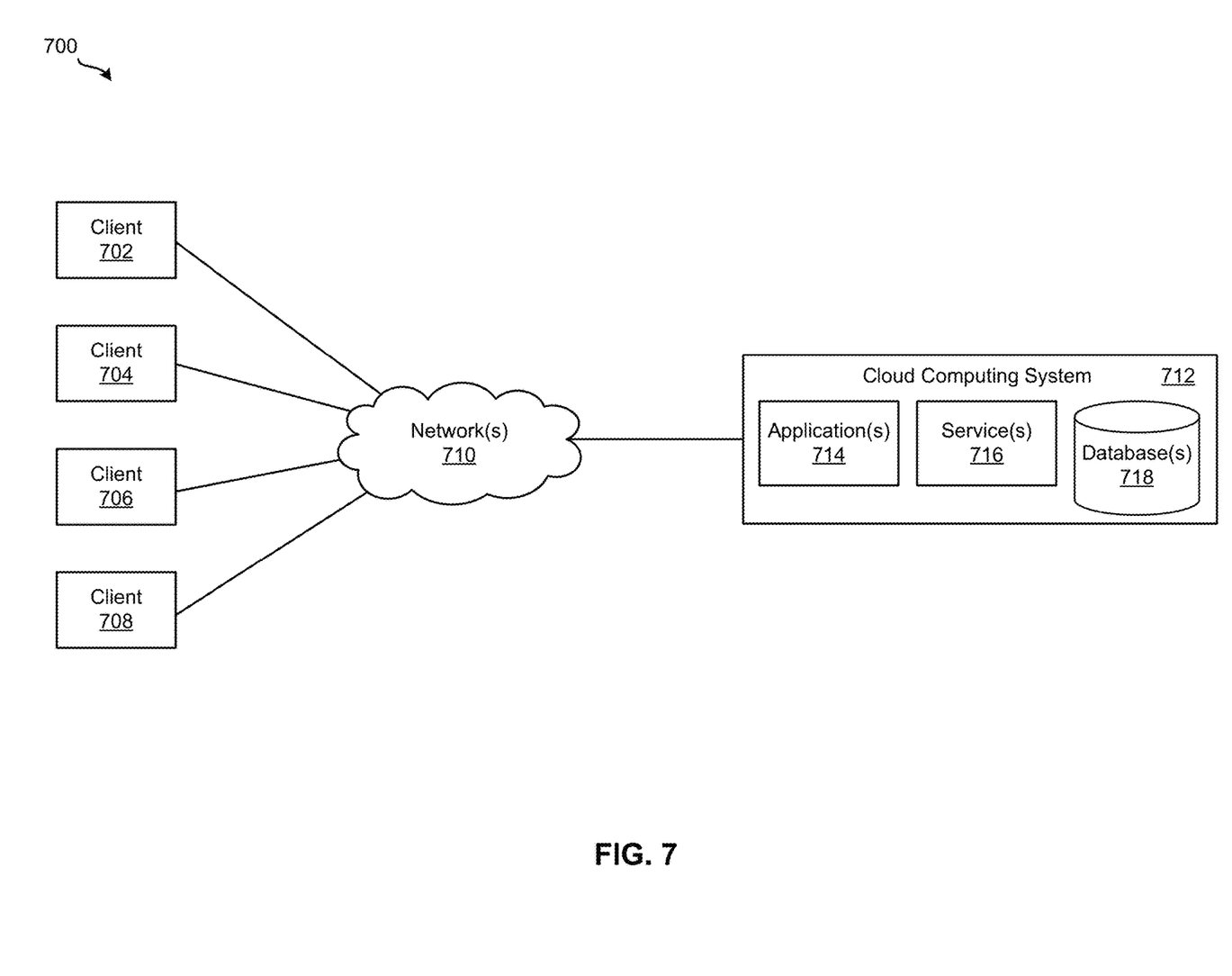
FIG. 7 illustrates system for implementing various embodiments described above.

FIG. 7 illustrates an exemplary system 700 for implementing various embodiments described above. For example, cloud computing system 712 of system 700 may be used to implement computing system 145, one of client devices 702-708 may be used to implement client device 105, and one of client devices 702-708 may be used to implement client device 165. As shown, system 700 includes client devices 702-708, one or more networks 710, and cloud computing system 712. Cloud computing system 712 is configured to provide resources and data to client devices 702-708 via networks 710. In some embodiments, cloud computing system 700 provides resources to any number of different users (e.g., customers, tenants, organizations, etc.). Cloud computing system 712 may be implemented by one or more computer systems (e.g., servers), virtual machines operating on a computer system, or a combination thereof.

As shown, cloud computing system 712 includes one or more applications 714, one or more services 716, and one or more databases 718. Cloud computing system 700 may provide applications 714, services 716, and databases 718 to any number of different customers in a self-service, subscription-based, elastically scalable, reliable, highly available, and secure manner.

In some embodiments, cloud computing system 700 may be adapted to automatically provision, manage, and track a customer's subscriptions to services offered by cloud computing system 700. Cloud computing system 700 may provide cloud services via different deployment models. For example, cloud services may be provided under a public cloud model in which cloud computing system 700 is owned by an organization selling cloud services and the cloud services are made available to the general public or different industry enterprises. As another example, cloud services may be provided under a private cloud model in which cloud computing system 700 is operated solely for a single organization and may provide cloud services for one or more entities within the organization. The cloud services may also be provided under a community cloud model in which cloud computing system 700 and the cloud services provided by cloud computing system 700 are shared by several organizations in a related community. The cloud services may also be provided under a hybrid cloud model, which is a combination of two or more of the aforementioned different models.

In some instances, any one of applications 714, services 716, and databases 718 made available to client devices 702-708 via networks 710 from cloud computing system 700 is referred to as a "cloud service." Typically, servers and systems that make up cloud computing system 700 are different from the on-premises servers and systems of a customer. For example, cloud computing system 700 may host an application and a user of one of client devices 702-708 may order and use the application via networks 710.

Applications 714 may include software applications that are configured to execute on cloud computing system 712 (e.g., a computer system or a virtual machine operating on a computer system) and be accessed, controlled, managed, etc. via client devices 702-708. In some embodiments, applications 714 may include server applications and/or mid-tier applications (e.g., HTTP (hypertext transport protocol) server applications, FTP (file transfer protocol) server applications, CGI (common gateway interface) server applications, JAVA server applications, etc.). Services 716 are software components, modules, application, etc. that are configured to execute on cloud computing system 712 and provide functionalities to client devices 702-708 via networks 710. Services 716 may be web-based services or on-demand cloud services.

Databases 718 are configured to store and/or manage data that is accessed by applications 714, services 716, and/or client devices 702-708. For instance, storages 155 and 160 may be stored in databases 718. Databases 718 may reside on a non-transitory storage medium local to (and/or resident in) cloud computing system 712, in a storage-area network (SAN), on a non-transitory storage medium local located remotely from cloud computing system 712. In some embodiments, databases 718 may include relational databases that are managed by a relational database management system (RDBMS). Databases 718 may be a column-oriented databases, row-oriented databases, or a combination thereof. In some embodiments, some or all of databases 718 are in-memory databases. That is, in some such embodiments, data for databases 718 are stored and managed in memory (e.g., random access memory (RAM)).

Client devices 702-708 are configured to execute and operate a client application (e.g., a web browser, a proprietary client application, etc.) that communicates with applications 714, services 716, and/or databases 718 via networks 710. This way, client devices 702-708 may access the various functionalities provided by applications 714, services 716, and databases 718 while applications 714, services 716, and databases 718 are operating (e.g., hosted) on cloud computing system 700. Client devices 702-708 may be computer system 500 or computing device 600, as described above by reference to FIGS. 5 and 6, respectively. Although system 700 is shown with four client devices, any number of client devices may be supported.

Networks 710 may be any type of network configured to facilitate data communications among client devices 702-708 and cloud computing system 712 using any of a variety of network protocols. Networks 710 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
   providing a set of selectable user interface (IU) items in a graphical user interface (GUI), wherein each selectable UI item represents a visualization collection;
   receiving, through a selection of a UI item in the set of UI items that represents the corresponding visualization collection, a request to perform a set of data processing units on a set of data, wherein the set of data processing units are deployed on a computing system, wherein the set of data comprises a visualization collection definition for the visualization collection;
   retrieving the set of data;
   sending the computing system a request for the set of data processing units;
   receiving the set of data processing units from the computing system;
   generating a background user interface (UI) page, the background UI page configured to execute on the device;
   loading the set of data processing units in the background UI page;
   instructing the background UI page to perform the set of data processing units on the set of data by generating a set of visualizations based on the visualization collection definition; and
   providing results from performing the set of data processing units on the set of data.

2. The non-transitory machine-readable medium of claim 1, wherein the set of processing units comprises a set of Javascript files, each Javascript file in the set of Javascript files comprising Javascript code.

3. The non-transitory machine-readable medium of claim 1, wherein retrieving the set of data comprises:
   determining whether the set of data is stored in a storage of the device;
   upon determining that the set of data is stored in the storage of the device, retrieving the set of data from the storage; and
   upon determining that the set of data is not stored in the storage of the device, retrieving the set of data from the computing system.

4. The non-transitory machine-readable medium of claim 1, wherein the program further comprise a set of instructions for providing a notification indicating that the set of data processing units are being performed on the set of data while the background UI page is performing the set of data processing units on the set of data.

5. The non-transitory machine-readable medium of claim 1, wherein code used to implement the set of data processing units is not native to the device.

6. The non-transitory machine-readable medium of claim 1, wherein the program further comprises sets of instructions for:
   checking a version of the set of data;
   checking a version of the set of data processing units; and
   determining whether the version of the set of data and the version of the set of data processing units are compatible.

7. The non-transitory machine-readable medium of claim 6, wherein instructing the background UI page to perform the set of data processing units on the set of data comprises instructing the background UI page to perform the set of data processing units on the set of data upon determining that the version of the set of data and the version of the set of data processing units are compatible.

8. A method, executable by a device, comprising:
providing a set of selectable user interface (IU) items in a graphical user interface (GUI), wherein each selectable UI item represents a visualization collection;
receiving, through a selection of a UI item in the set of UI items that represents the corresponding visualization collection, a request to perform a set of data processing units on a set of data, wherein the set of data processing units are deployed on a computing system, wherein the set of data comprises a visualization collection definition for the visualization collection;
retrieving the set of data;
sending the computing system a request for the set of data processing units;
receiving the set of data processing units from the computing system;
generating a background user interface (UI) page, the background UI page configured to execute on the device;
loading the set of data processing units in the background UI page;
instructing the background UI page to perform the set of data processing units on the set of data by generating a set of visualizations based on the visualization collection definition; and
providing results from performing the set of data processing units on the set of data.

9. The method of claim 8, wherein the set of processing units comprises a set of Javascript files, each Javascript file in the set of Javascript files comprising Javascript code.

10. The method of claim 8, wherein retrieving the set of data comprises:
determining whether the set of data is stored in a storage of the device;
upon determining that the set of data is stored in the storage of the device, retrieving the set of data from the storage; and
upon determining that the set of data is not stored in the storage of the device, retrieving the set of data from the computing system.

11. The method of claim 8 further comprising providing a notification indicating that the set of data processing units are being performed on the set of data while the background UI page is performing the set of data processing units on the set of data.

12. The method of claim 8 further comprising:
checking a version of the set of data;
checking a version of the set of data processing units; and
determining whether the version of the set of data and the version of the set of data processing units are compatible.

13. The method of claim 12, wherein instructing the background UI page to perform the set of data processing units on the set of data comprises instructing the background UI page to perform the set of data processing units on the set of data upon determining that the version of the set of data and the version of the set of data processing units are compatible.

14. A system comprising:
a set of processing units; and
a non-transitory machine-readable medium storing instructions that when executed by at least one processing unit in the set of processing units cause the at least one processing unit to:
provide a set of selectable user interface (IU) items in a graphical user interface (GUI), wherein each selectable UI item represents a visualization collection;
receive, through a selection of a UI item in the set of UI items that represents the corresponding visualization collection, a request to perform a set of data processing units on a set of data, wherein the set of data processing units are deployed on a computing system, wherein the set of data comprises a visualization collection definition for the visualization collection;
retrieve the set of data;
send the computing system a request for the set of data processing units;
receive the set of data processing units from the computing system;
generate a background user interface (UI) page, the background UI page configured to execute on the device;
load the set of data processing units in the background UI page;
instruct the background UI page to perform the set of data processing units on the set of data by generating a set of visualizations based on the visualization collection definition; and
provide results from performing the set of data processing units on the set of data.

15. The system of claim 14, wherein the set of processing units comprises a set of Javascript files, each Javascript file in the set of Javascript files comprising Javascript code.

16. The system of claim 14, wherein retrieving the set of data comprises:
determining whether the set of data is stored in a storage of the device;
upon determining that the set of data is stored in the storage of the device, retrieving the set of data from the storage; and
upon determining that the set of data is not stored in the storage of the device, retrieving the set of data from the computing system.

17. The system of claim 14, wherein the instructions further cause the at least one processing unit to provide a notification indicating that the set of data processing units are being performed on the set of data while the background UI page is performing the set of data processing units on the set of data.

18. The system of claim 14, wherein code used to implement the set of data processing units is not native to the system.

19. The system of claim 14, wherein the instructions further cause the at least one processing unit to:
check a version of the set of data;
check a version of the set of data processing units; and
determining whether the version of the set of data and the version of the set of data processing units are compatible.

20. The system of claim 19, wherein instructing the background UI page to perform the set of data processing units on the set of data comprises instructing the background UI page to perform the set of data processing units on the set of data upon determining that the version of the set of data and the version of the set of data processing units are compatible.

* * * * *